US006661107B2

(12) United States Patent
Higuchi et al.

(10) Patent No.: US 6,661,107 B2
(45) Date of Patent: Dec. 9, 2003

(54) ENGINE GENERATOR

(75) Inventors: Masaaki Higuchi, Tokyo (JP); Shinichi Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 99 days.

(21) Appl. No.: 10/012,414

(22) Filed: Dec. 12, 2001

(65) Prior Publication Data

US 2002/0070552 A1 Jun. 13, 2002

(30) Foreign Application Priority Data

Dec. 13, 2000 (JP) .................................... 2000-378898

(51) Int. Cl.[7] .................................... H02P 9/04

(52) U.S. Cl. .......................... 290/1 A; 290/1 B; 322/1

(58) Field of Search ............................ 290/1 A, 1 B, 290/1 C; 322/1; 310/51; 123/2

(56) References Cited

U.S. PATENT DOCUMENTS 3,259,752 A 7/1966 Soichiro Honda
4,595,841 A * 6/1986 Yaguchi .................... 290/1 A
4,608,946 A * 9/1986 Tanaka et al. ................. 123/2
4,647,835 A * 3/1987 Fujikawa et al. .............. 322/1
4,657,290 A * 4/1987 Linden .......................... 290/2
4,827,147 A 5/1989 Mizushima
5,890,460 A * 4/1999 Ball et al. .................. 123/41.7
5,977,667 A * 11/1999 Hirose ......................... 310/51
6,039,009 A * 3/2000 Hirose .......................... 123/2
6,119,636 A 9/2000 Fan
6,431,126 B2 * 8/2002 Saito ............................ 123/2

FOREIGN PATENT DOCUMENTS

JP 61-66631 5/1986
JP 11-200861 7/1999

* cited by examiner

*Primary Examiner*—Nicholas Ponomarenko
(74) *Attorney, Agent, or Firm*—McGinn & Gibb, PLLC

(57) ABSTRACT

An engine generator having an engine unit and generator are accommodated in a noise insulation case with a crankshaft oriented in a widthwise direction of the noise insulation case. An air cleaner is disposed at the front end of the noise insulation case and a muffler is disposed at the rear end of the noise insulation case with an engine between. When the engine generator is used as a generator, a generator and a recoil starter are connected with one end of the crankshaft. When the engine generator is used as a utility engine, the recoil starter is connected with one end of the crankshaft and a driven member is connected with the other end of the crankshaft.

3 Claims, 13 Drawing Sheets

10 : NOISE INSULATION CASE
13,14 : SIDE PORTION
40 : ENGINE UNIT
41 : CRANKCASE
43 : ENGINE
44 : CRANKSHAFT
51 : RECOIL STARTER
53 : RECOIL ROPE
54 : RECOIL PULLEY
57 : FLYWHEEL
60 : GENERATOR
61 : OUTER ROTOR
64 : COOLING FAN
66 : FAN COVER
67 : GENERATOR COVER

ENGINE GENERATOR

BACKGROUND OF THE INVENTION

1. Field of the Invention

The present invention relates to an engine generator and more particularly to an engine generator which can be used as a utility engine.

2. Discussion of Prior Arts

In general, many of engine generators have noise insulator cases in which engines and generators driven by the engines are accommodated. This type of engine generators are disclosed in Japanese Utility Model Application Laid-open No. Jitsu-Kai-Sho 61-66631 and Japanese Patent Application Laid-open No. Toku-Kai-Hei 11-200861. The noise insulation case, in general, has a rectangular box like configuration, in which the engine is mounted such that a crankshaft of the engine is directed in a longitudinal direction of the case.

Utility engines are used to give a rotation and torque to miscellaneous driven members, such as hydraulic pumps, compressors and the like by connecting the driven members to the crankshaft. Further, when the utility engines are used in rammers for civil engineering works, the rotation motion of the crankshaft is converted into a linear reciprocating motion of vibration mechanisms.

In prior arts, generally, an engine for generator differs from a utility engine in their constituting components, although both engines have a similar power, because respective fundamental constructions of engine units are different from each other. That is, in case of a utility engine, both ends of the crankshaft project from the crankcase. Further, a recoil starter is mounted on one end and a driven member such as a hydraulic pump is mounted on the other end.

On the other hand, in case of an engine generator having a noise insulation case wherein an engine and a generator are integrally accommodated, since the engine is longitudinally mounted in the noise insulation case in such a manner that a crankshaft of the engine directs in a longitudinal direction of the noise insulation case, generally, a muffler is disposed behind the engine, that is, on an extension line of the crankshaft and an air cleaner is disposed on the frontal side of the engine. The reason why these muffler and air cleaner are disposed on both front and rear sides of the engine is that a width size of the noise insulation case should be prevented from increasing.

However, when the muffler is disposed on an extension line of the crankshaft, a space around the extension line of the crankshaft are occupied by the muffler and as a result a driven member can not be connected with the crankshaft. Therefore, an engine unit for an engine generator can not be used as a utility engine. Since there is a difference between an engine generator and utility engine in the fundamental layout of the engine unit, respective engines need dedicated components.

SUMMARY OF THE INVENTION

It is an object of the present invention to provide a compact engine generator and it is another object of the present invention to provide an engine unit of the engine generator capable of being employed as a utility engine.

To achieve these objects, an engine generator having an engine convertible into a utility engine, comprises a noise insulation case for accommodating the engine generator, a crankshaft of the engine arranged in a widthwise direction of the noise insulation case, a one end of the crankshaft extending from the engine toward one side of the noise insulation case, an other end of the crankshaft extending from the engine toward the other side of the noise insulation case, a recoil starter provided on the one end of the crankshaft, a flywheel including the recoil starter therein and provided on the one end of the crankshaft, a generator provided on the one end of the crankshaft, an air cleaner arranged on the front side of the noise insulation case, and an muffler arranged on the rear side of the noise insulation case. That is, the crankshaft of the engine and other shafts connecting with the crankshaft, the flywheel shaft, a recoil starter shaft and a generator shaft are arranged in a widthwise direction of the noise insulation case and the air cleaner and the muffler are arranged in a longitudinal direction of the noise insulation case.

DETAILED DESCRIPTION OF THE PREFERRED EMBODIMENT

Figure 1:
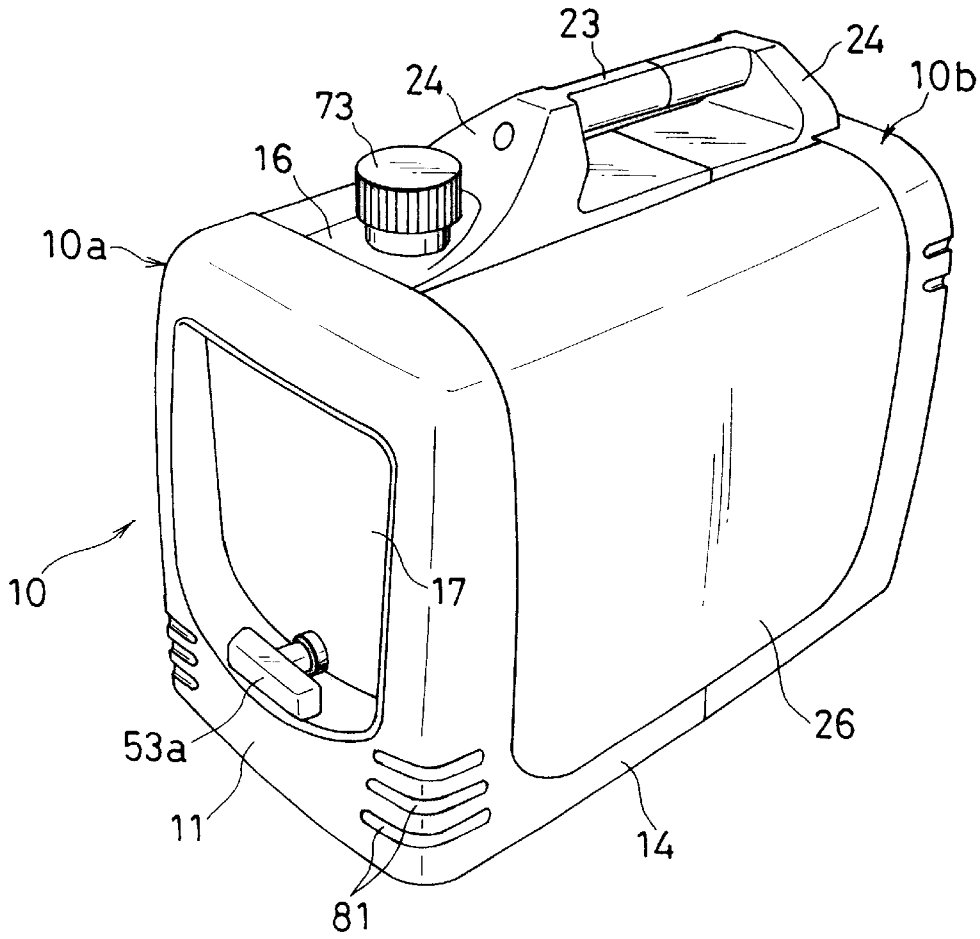
FIG. 1 is a front perspective view showing an engine generator capable of being employed as a utility engine according to an embodiment of the present invention.

Referring now to FIG. 1, a noise insulation case 10 includes a front section 11, a rear section 12, a left and right side sections 13, 14, a bottom section 15 and a top section 16, having a rectangular parallelepiped configuration. The front section 11 is a front end of the noise insulation case 10 and the rear section 12 is a rear end thereof. The front section 11 has a recess in which a control panel 17 is provided. An engine switch 18, an automatic throttle switch 19, an AC output terminal 20 for outputting generated power and a DC output terminal 21 for charging batteries are provided on the control panel 17, respectively.

Further, on the control panel 17, there are provided an operation indicator **22*a* for indicating an operative generator, an oil indicator 22*b* for warning against a shortage of engine oil, an overload indicator 22*c* for indicating an overload of the engine. On the top section 16, there is provided a stick like carrying handle 23 to be griped when a worker carries the engine generator. The carrying handle 23 extends in a longitudinal direction of the noise insulation case 10 and is connected at front and rear ends thereof with connecting sections 24, 24 integrally formed with the top section 16**.

The noise insulation case 10 comprises a first case member 10*a* and a second case member 10*b* molded by synthetic resin. The first case member 10*a* comprises a front section 11, a part of both side sections 13, 14, a part of the bottom section 15, a part of the top section 16 and is integrally formed therewith. The second case member 10*b* comprises a rear section 12, the rest part of both side sections 13, 14, the rest part of the bottom section 15, the rest part of the top section 16 and is integrally formed therewith. The respective case members 10*a*, 10*b* have connecting end surfaces 10*c*, 10*d* facing longitudinally so as to be longitudinally connected at those connecting end surfaces 10*c*, 10*d* with each other.

Figure 5:
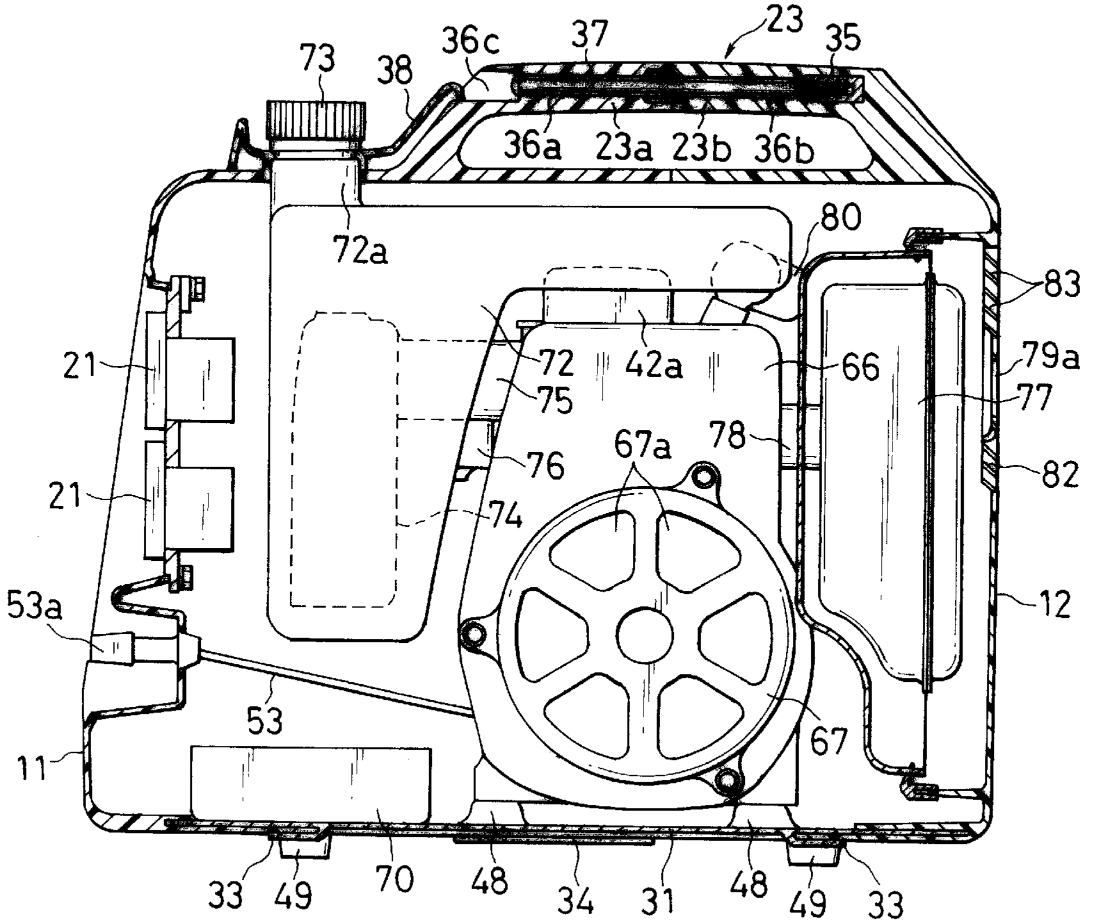
FIG. 5 is a sectional view taken along a right side portion of FIG. 1.
Figure 6:
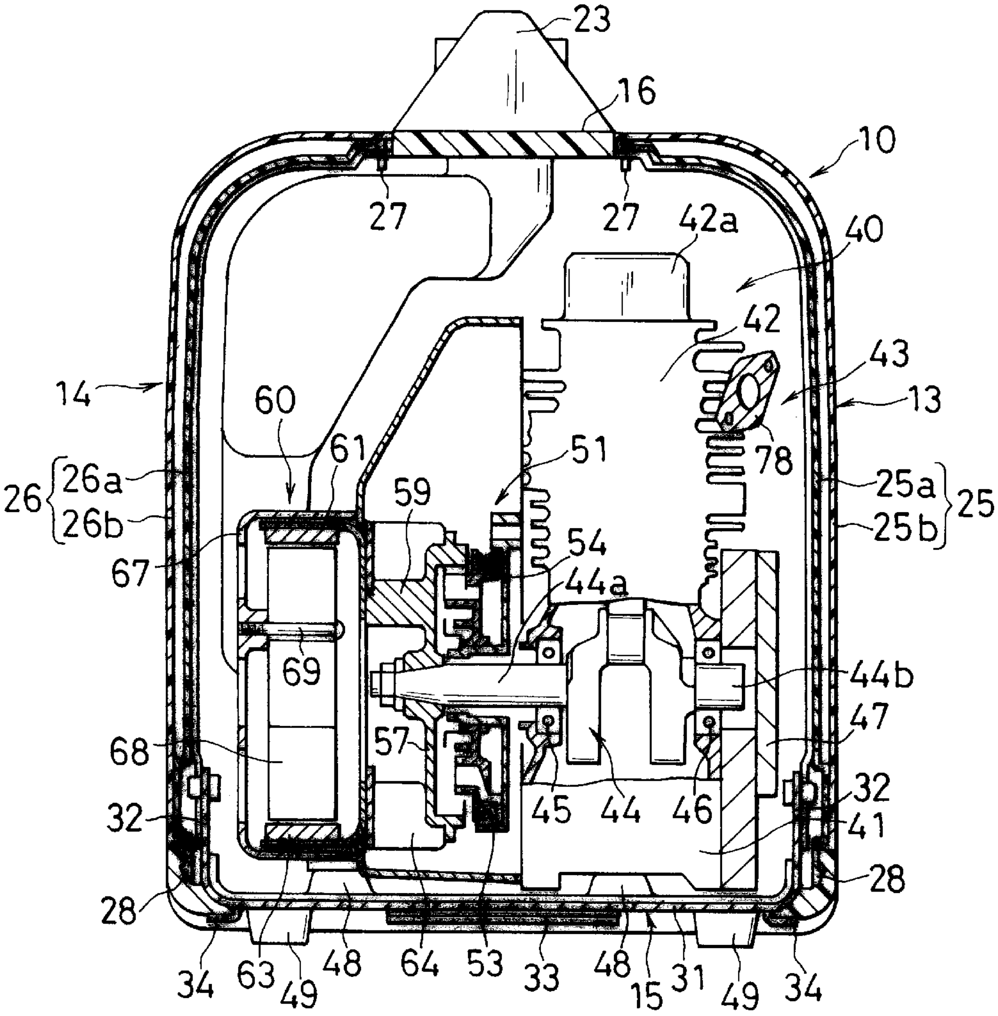
FIG. 6 is a sectional view taken along a rear portion of FIG. 1.
Figure 7:
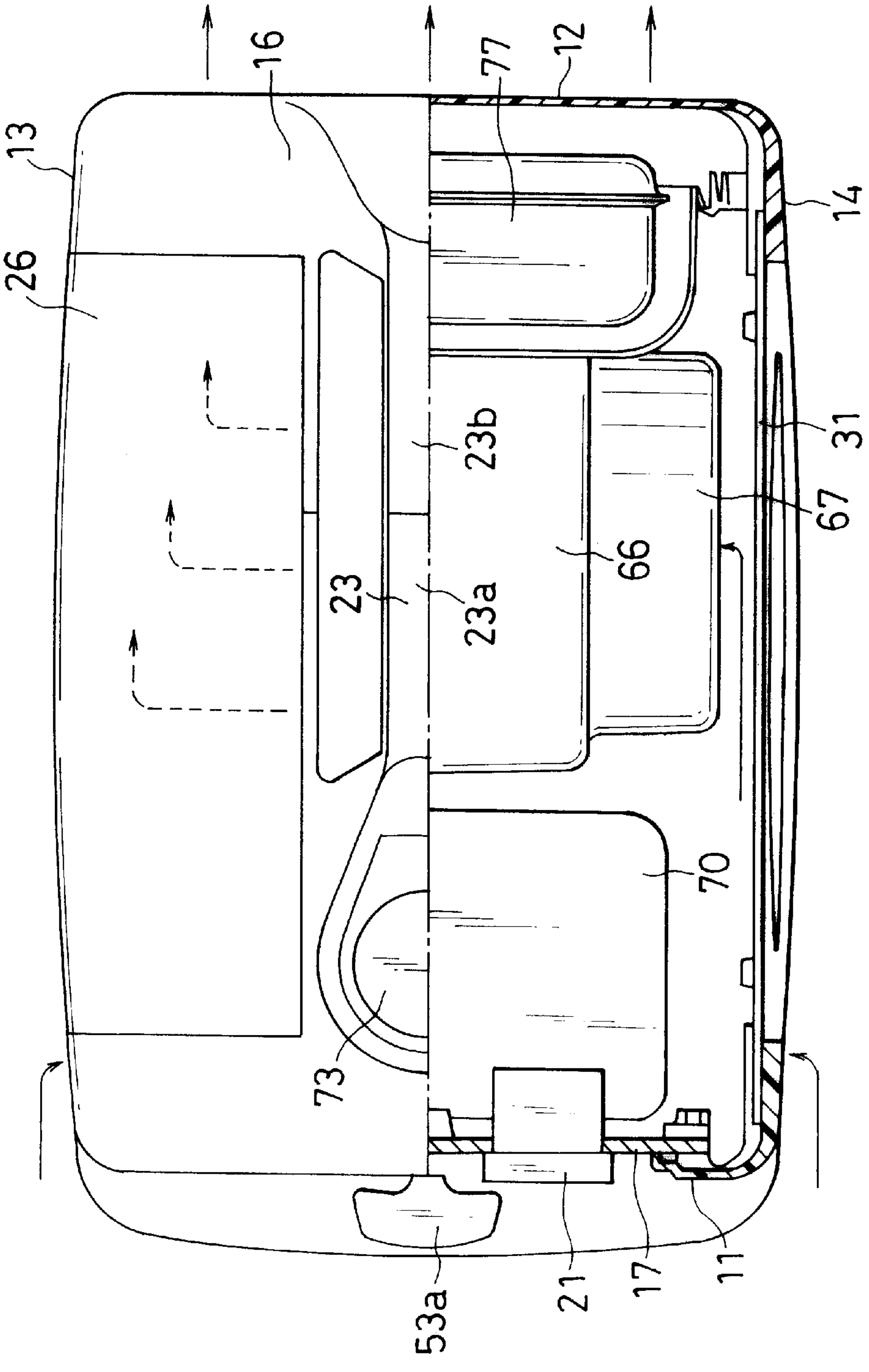
FIG. 7 is a partially sectional view taken along a top portion of FIG. 1.

Referring to FIGS. 5, 6 and 7, an opening is provided in the left and right side sections 13, 14 of the noise insulation case 10, respectively and the opening extends to a part of the top section 16. In order to open and close the left and right openings, L-shaped covers 25, 26 are provided detachably, respectively. As shown in FIG. 6, the L-shaped covers 25, 26 comprise a portion constituting a part of the top section 16 and a portion constituting a part of the side sections 13, 14 respectively. The L-shaped covers 25, 26 have a L-shaped cross section and a double wall structure constituted by inner plates 25*a*, 26*a* and outer plates 25*b*, 26*b* respectively and providing a noise insulation space between these inner and outer plates. There is provided a hook 28 for engaging with a groove formed in the top section 16 in the upper ends of the L-shaped covers 25, 26. Thus, maintenances of an engine are available by removing the L-shaped covers 25, 26.

The case member 10*a*, 10*b* are connected at the bottom section 15 with a base plate 31 fabricated by sheet metal. The base plate 31 has a rectangular shape and has a vertical section bent upward 32 on both sides thereof. Further, the base plate 31 has a fitting end 33 with a slit at front and rear edges thereof, respectively and has a fitting end 34 with a slit on left and right edges thereof, respectively. The case member 10*a*, 10*b* are interleaved at the bottom section 15 between the slits of the fitting ends 33, 34 and are connected with the base plate 31.

On the other hand, in order to connect two case members 10*a*, 10*b* at the handle 23, as shown in FIG. 5, an internal thread member 35 having a taped hole is formed by insert molding in a first handle part 23*b* integrally molded with the case member 10*b*. Further, a through hole 36*b* having a larger diameter than the taped hole is formed in the first handle part 23*b* adjacent to and at the front of the internal thread member 35. On the other hand, a second handle part 23*a* integrally molded with the case member 10*a* has a through hole 36*a* having the same diameter as the through hole 36*b*. Further, a large diameter hole 36*c* is formed in the second handle part 23*a* on the frontal side of the through hole 36*a*. Accordingly, when an external thread member 37 is inserted into the through hole 36*a* from the large diameter hole 36*c* and is screwed in the internal thread member 35, the case member 10*a* is connected with the case member 10*b* at the boundary of the first handle part 23*b* and the second handle part 23*a*, thus a stick like handle 23 is assembled by the connection of both handle parts 23*a*, 23*b*.

Thus, since two case members 10*a*, 10*b* are longitudinally connected at the bottom section 31 with each other and also connected at the boundary of two handle parts 23*a*, 23*b* by the external thread member 37, no screw heads can be observed from the outside of the noise insulation case 10, this structure providing an aethetically good appearance. In case where the noise insulation case 10 is divided into two left and right parts, a larger number of screw members for tightening these parts is needed than the number of screw members in case of this method of dividing the noise insulation case 10 in the longitudinal direction.

As shown in FIG. 6, an engine unit 40 has an engine 43 incorporating a crankcase 41 and a cylinder 42 covered with a head cover 42*a*. The engine 43 is mounted in the noise insulation case 10 in such a manner that a crankshaft 44 incorporated in the crankcase 41 directs in a widthwise direction of the noise insulation case 10. The crankshaft 44 extends laterally approximately under the longitudinally middle portion of the handle 23. As shown in FIG. 6, the engine 43 is mounted being biased toward the side section 13. The crankshaft 44 is rotatably supported at one end section 44*a* thereof by a bearing 45 on a magneto side of the crankcase 41 and is rotatably supported at the other end section 44*b* thereof by a bearing 46 on the opposite side of the bearing 45. The one end section 44*a* projects outside of the crankcase 41 and the other end section 44*b* is covered with a detachable shaft cover 47. The engine unit 40 is mounted on the base plate 31 through a plurality of vibration isolating rubbers 48 and the base plate 31 has rubber mounts 49 underneath.

Figure 8:
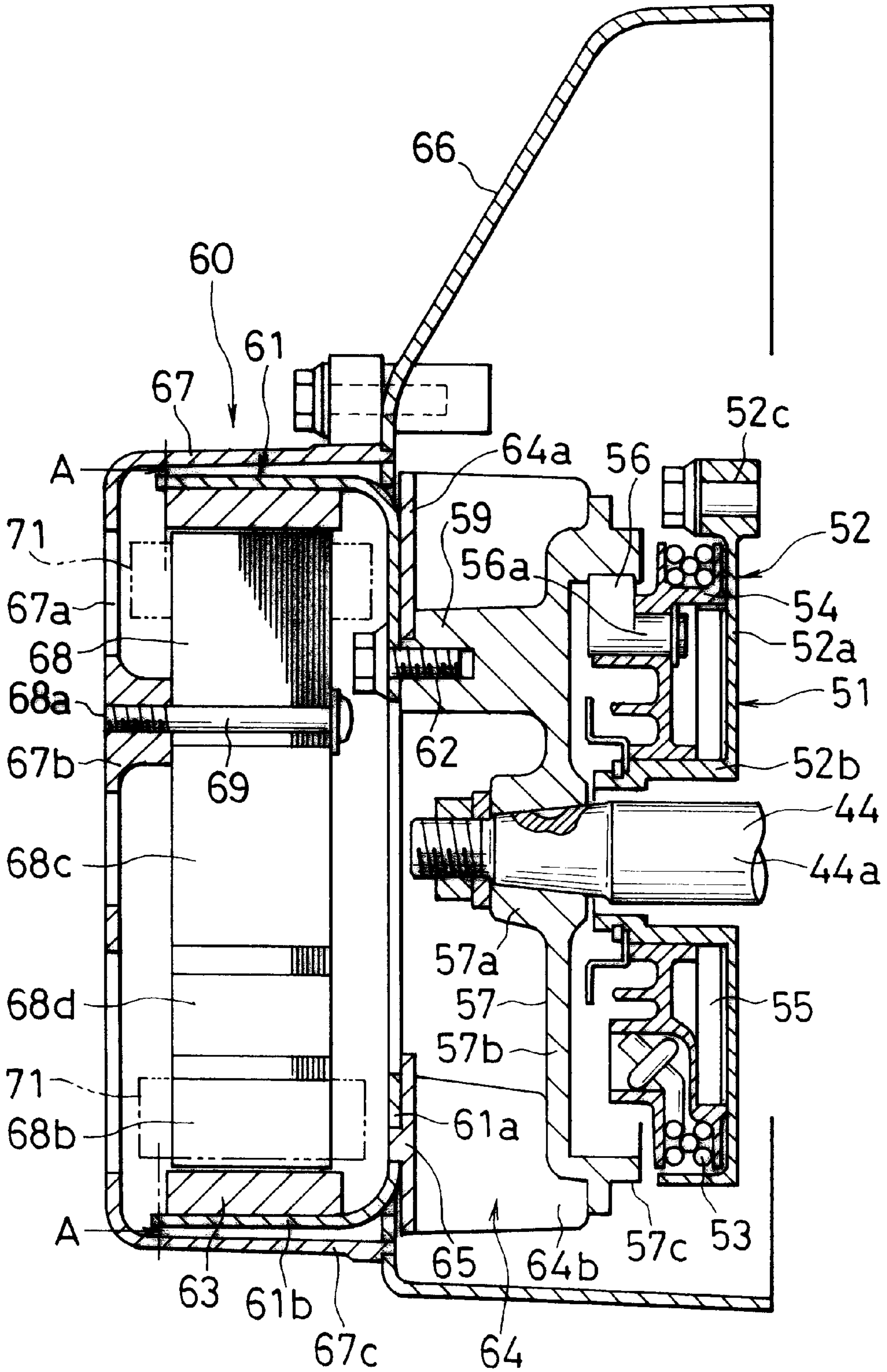
FIG. 8 is an enlarged sectional view of FIG. 6.

Referring to FIG. 8, a recoil starter 51 is mounted on the magneto side of the engine 43. The recoil starter 51 has a recoil holder 52 integrally formed with a disc section 52*a* and a cylinder section 52*b*. The disc section 52*a* is secured to the engine 43 by a plurality of bolts going through a plurality of installation holes 52*c*. The one end section 44*a* of the crankshaft 44 penetrates the inside of the cylinder section 52*b* through a gap. A recoil pulley 54 is rotatably mounted on the outside of the cylinder section 52*b* and a recoil rope 53 is wound around the recoil pulley 54. Also, a return spring 55 is provided on a recoil holder 52 to apply the spring force in a winding direction of the recoil rope 53. Further, a rotary pin 56*a* having an engagement hook 56 is provided is rotatably mounted on the recoil pulley 54. When the recoil pulley 54 is rotated by the recoil rope 53, the rotary pin 56*a* rotates such that the engagement hook 56 is lifted up in an outward, radial direction by centrifugal force.

A flywheel 57 is mounted on a projection of the crankshaft 44. The flywheel 57 includes a boss section 57*a* fixed to the crankshaft 44 through a key and a disc section 57*b* provided around the boss section 57*a*. Further, an engagement ring section 57*c* is provided around the disc section 57*b*. A protrusion section is formed on the inner periphery surface of the engagement ring section 57*c* in a radial inner direction so as to be engaged with the engagement hook 56. Accordingly, when the recoil rope 53 is drawn out to rotate the crankshaft 44, the engagement hook 56 is engaged with the protrusion section by centrifugal force and the crankshaft 44 is started to rotate through the flywheel 57. A part of the recoil pulley 54 is accommodated inside of the engagement ring 57*a* of the flywheel 57 and therefore the flywheel 57 constitutes a part of the recoil starter 51. As a result, a total width of the flywheel 57 and the recoil starter 51 can be reduced. Since the recoil starter 51 is mounted on the root of the projection section of the crankshaft 44, the pulling force of the rope can be converted into a rotation force without giving a large bending force to the crankshaft 44.

There are provided a plurality of connecting sections 59 projecting in an opposite direction to the engagement ring section 57*c* in the flywheel 57 and an outer rotor 61 of a generator 60 is mounted on the connecting sections 59 through bolts 62. The outer rotor 61 comprises a disc section 61*a* which is connected with the connecting section 59 and a cylinder section 61*b* integrally formed with the disc section 61*a*. A plurality of magnets 63 are fixed to the inner periphery surface of the cylinder section 61*b* at a specified interval in a circumferential direction.

A cooling fan 64 is disposed between the flywheel 57 and the outer rotor 61. The cooling fan 64 has a disc section 64*a* including a ventilation guide hole at the center thereof and a plurality of fan blades 64*b* integrally provided on the surface of the disc section 64*a*. The disc section 64*a* is interleaved between the disc section 61*a* of the outer rotor 61 and the connecting section 59 of the flywheel 57. The disc section 64*a* is secured to the outer rotor 61 by fitting an engagement projection 65 to an engagement hole formed on the disc section 61*a*.

The cooling fan 64 is enclosed by a fan cover 66 fixed to the engine 43. This fan cover 66 functions as a duct for guiding air and cooling air discharged from the cooling fan 64 is guided toward the engine 43. A generator cover 67 is secured to the fan cover 66 and has a disc section 67*b* including a lot of ventilation holes 67*a* and a cylinder section 67*c* integrally formed with the disc section 67*b*. The generator cover 67 is secured to the fan cover at the cylinder section 67*c* thereof.

A stator 68 is disposed in the outer rotor 61 and is fixed to the generator cover 67 through a plurality of bolts 69 penetrating installation holes 68*a* of the generator cover 67. The stator 68 is formed by piling up a lot of steel plates and a lot of slits 68*b* extending in a radial direction are formed around the outer periphery of the stator 68. A coil 71 is wound around two adjacent slits 68*b*, respectively. Further, the stator 68 has a ventilation hole 68*c* in the center thereof and also has a plurality of ventilation holes 68*d* extending in the radial direction.

Thus, the generator 60 is an outer rotor type multi-pole generator characterized in a small axial length. Further, since the flywheel 57 is one of components of the recoil starter 51, the lengthwise size of the engine unit 40, that is, the widthwise size of the engine generator can be shortened. As shown in FIG. 5, an inverter unit 70 is mounted on the bottom surface of the noise insulation case 10. The inverter unit 70 is for controlling output of the generator 60 and for converting into alternating current having specified frequency.

Figure 2:
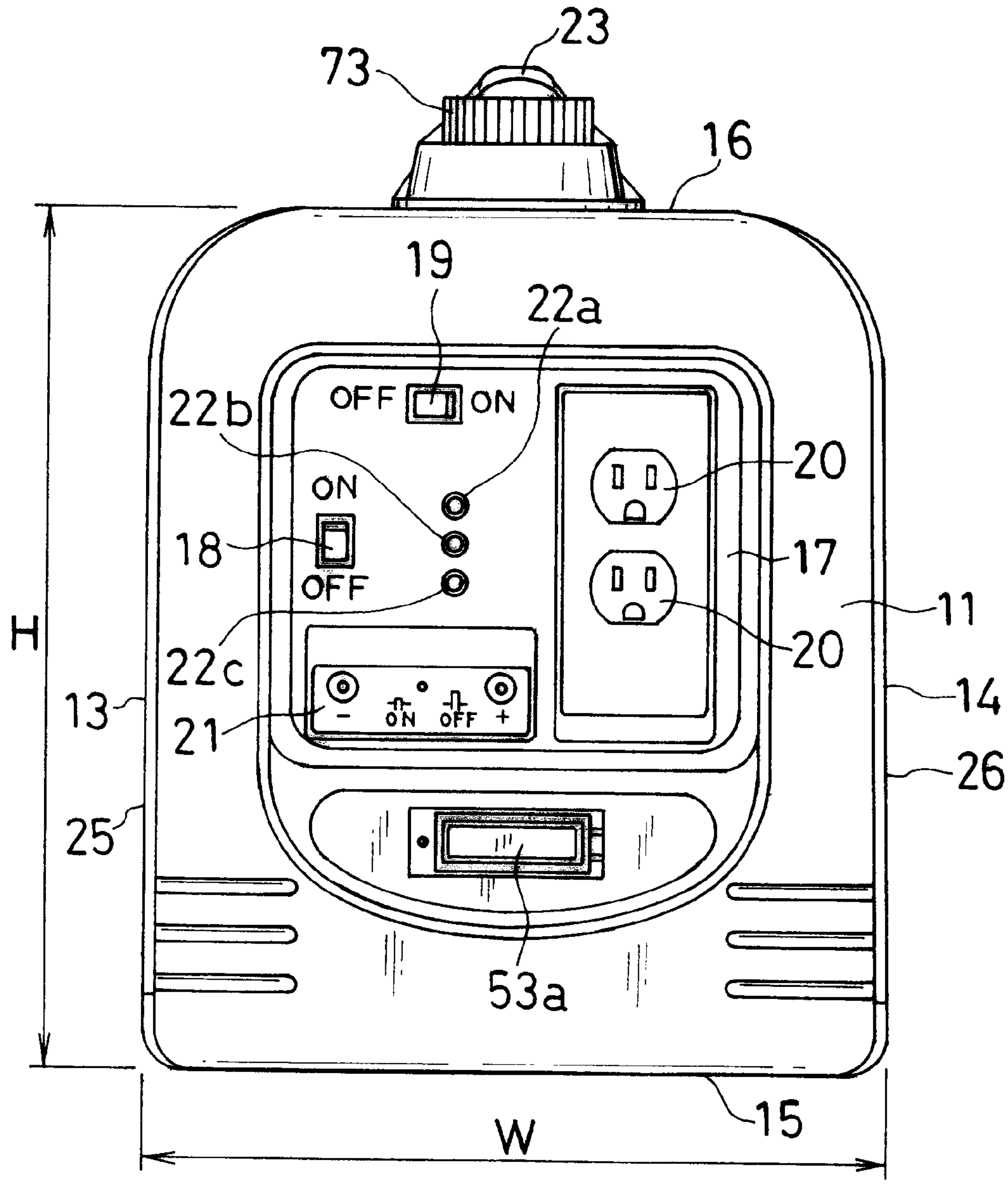
FIG. 2 is an elevational view of FIG. 1.
Figure 3:
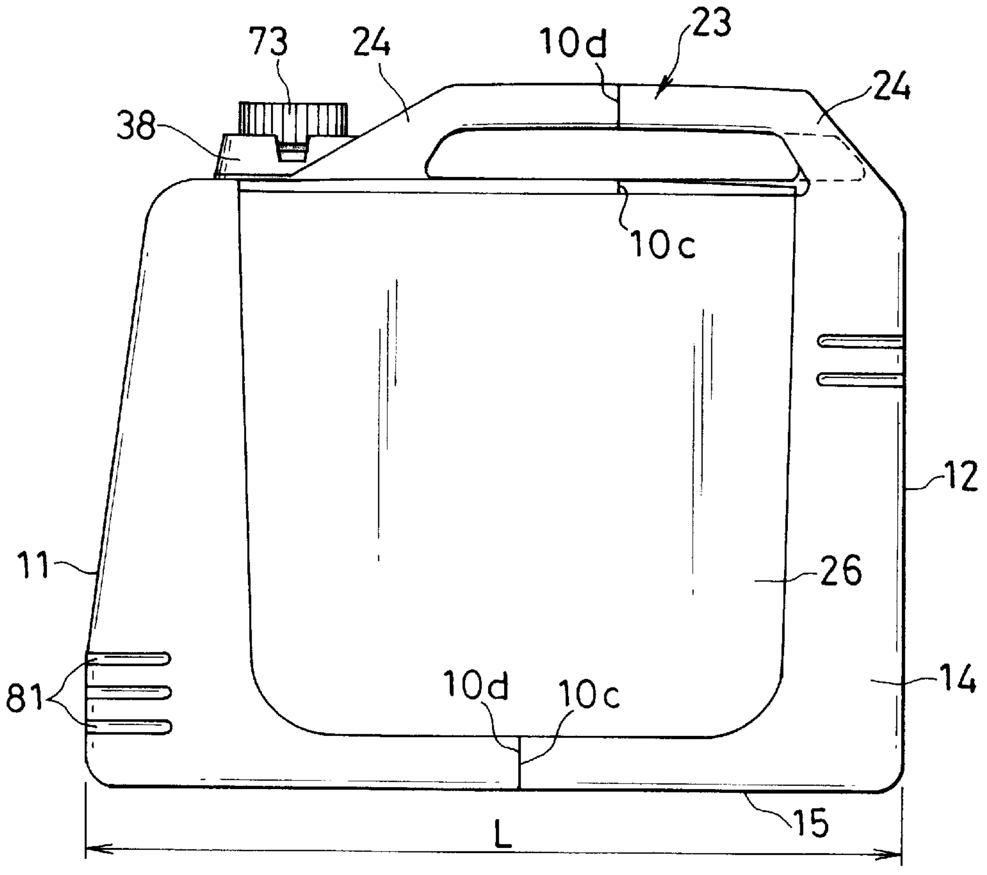
FIG. 3 is a side view of FIG. 1.
Figure 4:
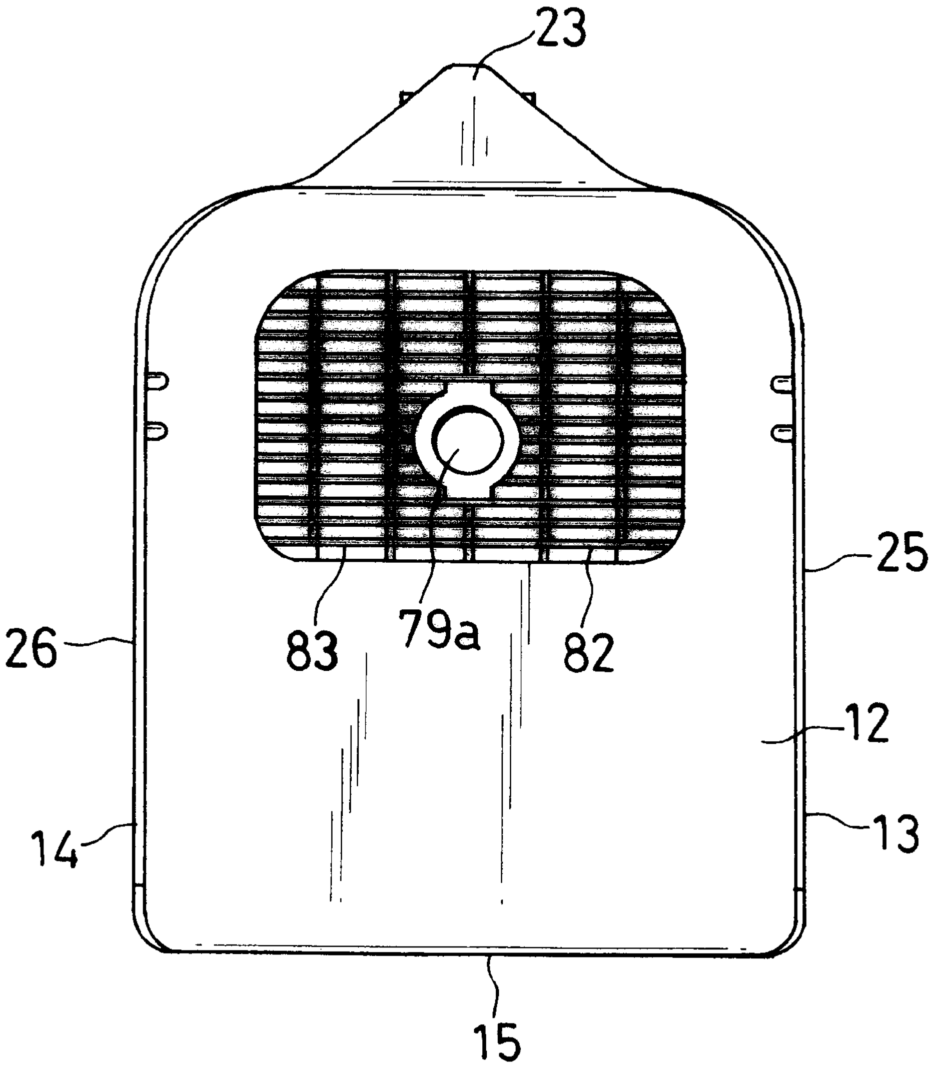
FIG. 4 is a rear view of FIG. 1.

The recoil starter 51 is located in the center of the engine generator when viewed from the front and the crankshaft 44 directs in the widthwise direction of the noise insulation case 10. Therefore, a recoil knob 53*a* can be disposed in the center of the front section 11 of the noise insulation case 10, as shown in FIG. 1 and FIG. 2. Since the recoil knob 53*a* is disposed at the lower part of the control panel 17, an operator can perform all operations, starting, stopping and the like from the front side.

Figure 9:
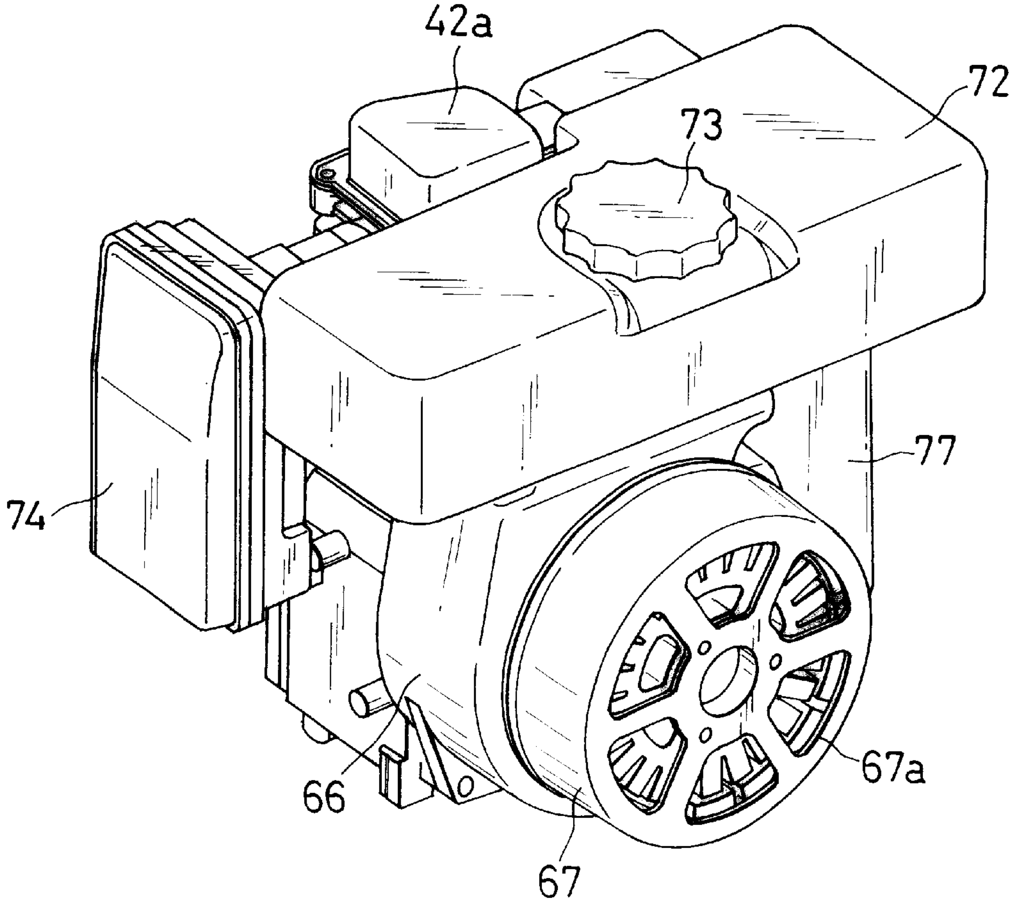
FIG. 9 is a front perspective view of an engine unit in a noise insulation case.
Figure 10:
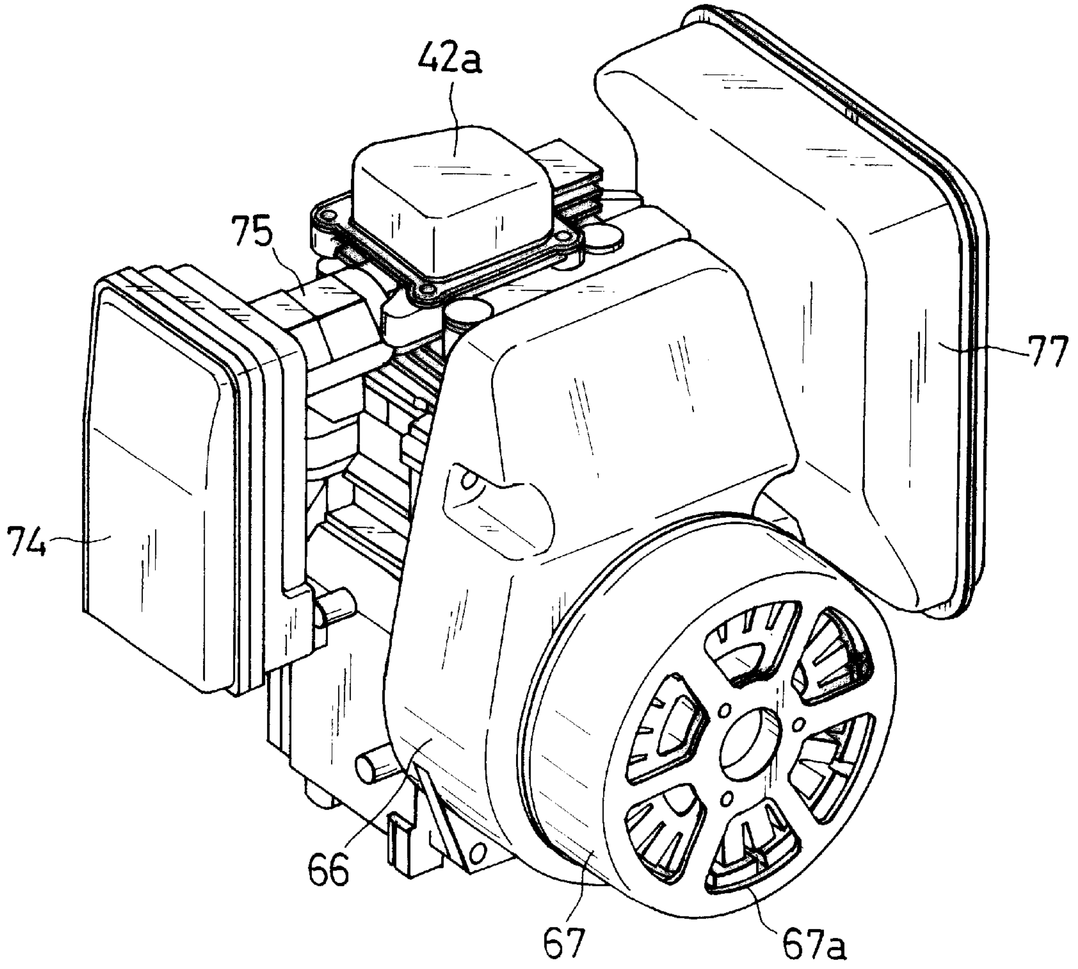
FIG. 10 is a front perspective view of the engine unit shown in FIG. 9 when a fuel tank is removed.

Referring to FIG. 9, a fuel tank 72 is disposed in the noise insulation case 10. Further, a filler inlet 72*a* of the fuel tank 72 is provided on the top section 16 and a tank cap 73 is screwed on the filler inlet 72*a*. The fuel tank 72 is located at the front side of the noise insulation case 10 on the opposite side of the engine 43.

Figure 12:
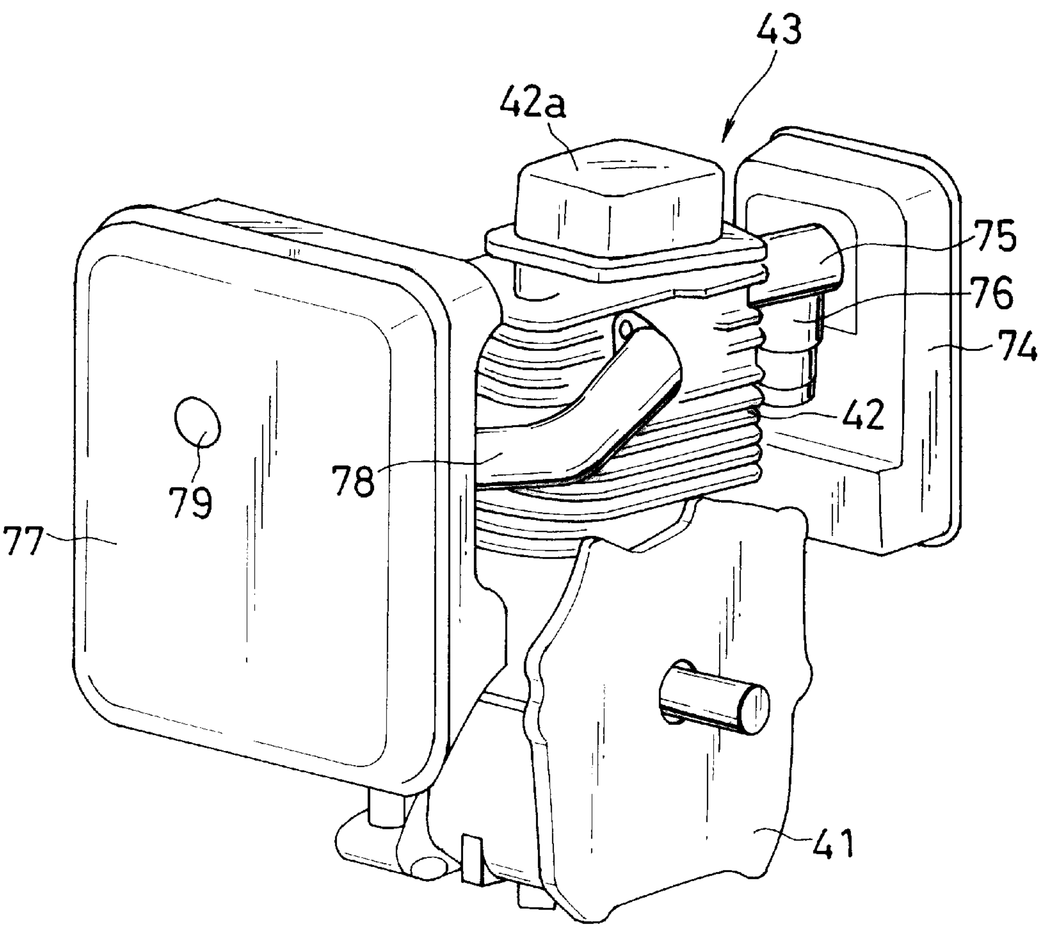
FIG. 12 is a rear perspective view of the engine unit shown in FIG. 11.

An air cleaner 74 for cleaning air to be supplied to the engine 43 is disposed on the frontal side of the noise insulation case 10. As shown in FIG. 12, the air cleaner 74 is attached to the engine 43 through an intake pipe 75 extending straight backward and a carburetor 76 is mounted on the intake pipe 75. On the other hand, a muffler 77 is disposed on the rear side of the noise insulation case 10 and is connected with the engine 43 through an exhaust pipe 78. An exhaust outlet 79 formed on the back side of the muffler 77 communicates with an exhaust outlet 79*a* formed on the back section 12 of the noise insulation case 10 and exhaust gas of the engine 43 is discharged from the back side of the noise insulation case 10. Thus, since the air cleaner 74 is disposed on the frontal side of the noise insulation case 10 and the muffler 77 is disposed on the rear side, the widthwise length of the noise insulation case 10 can be reduced.

An ignition coil 80 built in a plug cap is attached to the cylinder 42. When maintenance is performed on the plug cap, the air cleaner 74 and the like, the L-shaped cover 25 is displaced. Then, if it is not necessary to displace the L-shaped cover 26 on the opposite side, the L-shaped cover 26 may be a fixed type.

A plurality of cooling air inlets 81 is formed at the front end of the noise insulation case 10 and a plurality of cooling air outlets 82 are formed at the rear section 12. As shown in FIG. 5, the cooling air outlets 82 is constituted by louvers slanted downward. When operated, as shown in FIG. 7, cooling air introduced from the front end of the noise insulation case 10 and an inverter unit 70 is efficiently cooled by the cooling air. A part of the cooling air is sucked into the engine 43 through the air cleaner 74. On the other hand, the cooling air generated by the cooling fan 64 is introduced from either of the side sections 13, 14 of the noise insulation case 10 into a plurality of the ventilation holes 68*c*, 68*d* of the stator 68 through the ventilation holes 67*a* formed on the generator cover 67.

Next, the cooling air is guided by the fan cover 66, blowing the surrounding of the engine 43. Further, after blowing the engine 43, the cooling air turns its stream in the longitudinal direction towards a cooling air outlet 82 provided in the rear section 12 and cools the muffler 77. In order to make a stable stream of the cooling air toward the muffler 77, there is provided a partition for discriminating low temperature air from high temperature air in the noise insulation case 10.

As shown in FIG. 6, since the engine 43 is mounted on the right side of the noise insulation case 10 when viewed from the front side and the generator 60, the recoil starter 51 and the cooling fan 64 are disposed on the left side, a lateral center of gravity comes around the lateral center of the noise insulation case 10. On the other hand, since the air cleaner 74 is disposed on the front side of the noise insulation case 10, the muffler 77 is disposed on the rear side and the engine 43, the generator 60 are situated in the center, a longitudinal center of gravity comes around the longitudinal center of the noise insulation case 10. That is, the handle 23 is positioned approximately on the center of gravity of the engine generator. As a result, thus constituted engine generator has a good portability.

Figure 11:
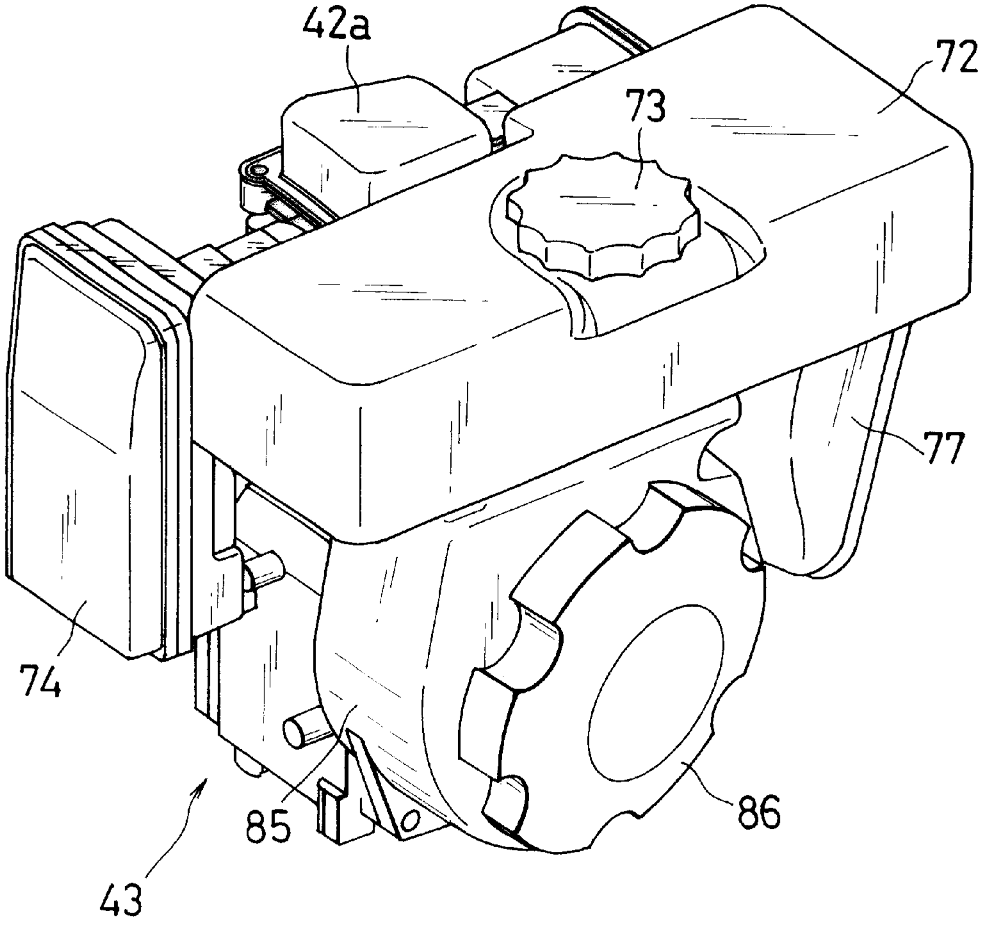
FIG. 11 is a front perspective view of an engine generator when an engine unit is used as a utility engine.
Figure 13:
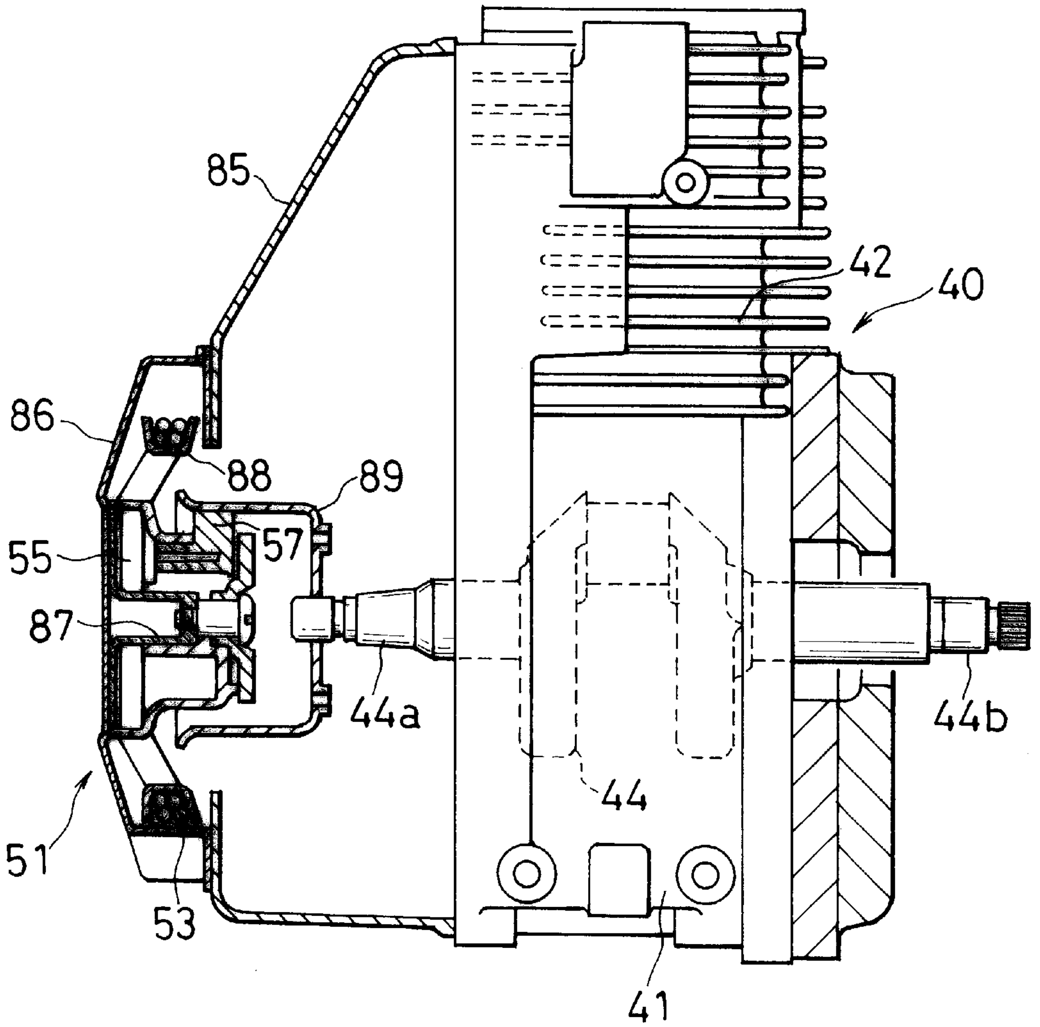
FIG. 13 is a sectional view of a recoil starter.

FIG. 11 is a perspective view of a utility engine modified from the engine unit 40 for the engine generator described before when viewed from the front side, FIG. 12 is a perspective view of the utility engine of FIG. 11 when viewed from the rear side, and FIG. 13 is a sectional view showing a recoil starter of the utility engine of FIG. 11.

As shown in FIG. 13, the crankshaft 44 of the utility engine is longer than that of the engine generator. Both ends 44*a*, 44*b* of the crankshaft 44 project from the crankcase 41, respectively. An engine cover 85 having similar configuration to the fan cover 66 is fixed to the engine unit 40 and a holder 87 is secured to a starter cover 86 attached to the engine cover 85. Further, a recoil pulley 88 around which a recoil rope 53 is wound is rotatably mounted on the holder 87 and the recoil pulley 88 is connected with one end 44*a* of the crankshaft 44 through a coupling 89. Further, a flywheel 57 is mounted on the recoil pulley 88.

In case where the engine unit 40 is used as a utility engine, the noise insulation case 10 is removed. The other end 44*b* of the crankshaft 44 projects from the crankcase 41 and miscellaneous driven members such as a hydraulic pump, a compressor, a rammer and the like are connected with this projection. As shown in FIG. 13, the configuration of the recoil starter 51 differs from that of the engine generator but other major components of the engine unit 40 such as the engine 43, air cleaner 74, muffler 77 and the like, are identical in either case of a utility engine or an engine generator.

The air cleaner 74 and the muffler 77 are identical to those used in the engine generator. The air cleaner 74 is disposed on the front side and the muffler 77 is disposed on the rear side in the same manner as in case of the engine generator. Accordingly, the muffler 77 or the air cleaner 74 are not interfered with on an extension line of both ends 44*a*, 44*b* of the crankshaft 44 and the other end 44*b* of the crankshaft 44 can be connected with miscellaneous driven members.

In case of the engine generator according to the present invention, since the air cleaner 74 and the muffler 77 are arranged with the engine 43 between and the engine unit 40 is mounted in such a manner the crankshaft 44 is oriented in a widthwise direction of the noise insulation case 10, the width of the engine generator can be shortened and as a result a compact engine generator can be realized. Further, the engine unit 40 can be converted into a utility engine without making a large modification.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An engine generator having an engine convertible into a utility engine, comprising:

a noise insulation case for accommodating said engine generator;

a crankshaft of said engine arranged in a widthwise direction of said noise insulation case;

a one end of said crankshaft extending from said engine toward one side of said noise insulation case;

an other end of said crankshaft extending from said engine toward the other side of said noise insulation case;

a recoil starter provided on said one end side of said crankshaft;

a flywheel including said recoil starter therein and provided on said one end of said crankshaft;

a generator provided on said one end side of said crankshaft;

an air cleaner arranged on the front side of said noise insulation case; and an muffler arranged on the rear side of said noise insulation case.

2. The engine generator according to claim 1, wherein said other end of said crankshaft is connected with miscellaneous driven members when said engine is used as a utility engine.

3. The engine generator according to claim 1, wherein said recoil starter is disposed inside of said flywheel and said generator is disposed outside of said flywheel.

* * * * *